Sept. 28, 1937. J. C. KARNES 2,094,015
SIGHT FOR ORDNANCES
Filed April 29, 1935
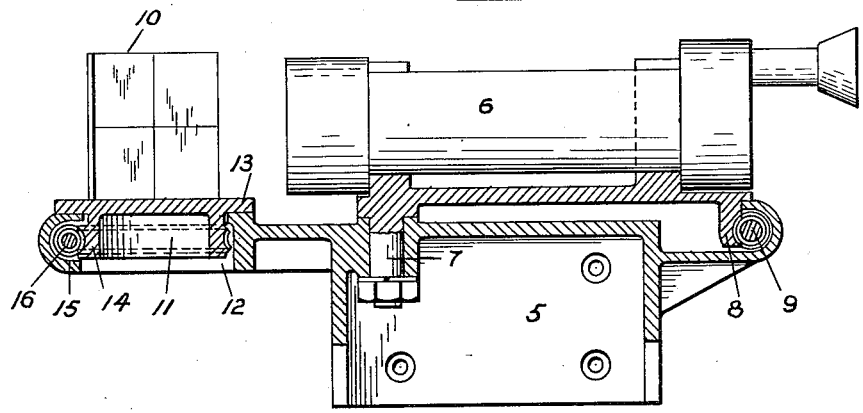
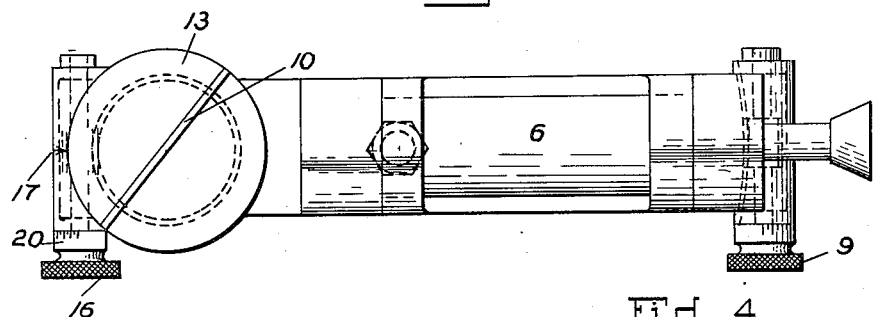
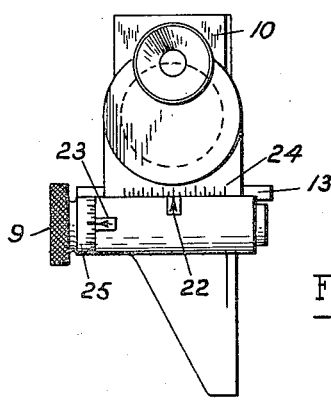
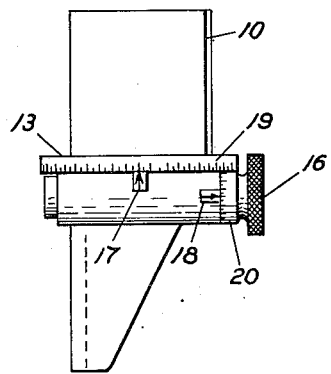
Inventor
James C. Karnes
By W. N. Roach
Attorney Patented Sept. 28, 1937

2,094,015

UNITED STATES PATENT OFFICE 2,094,015

SIGHT FOR ORDNANCE

James C. Karnes, Buffalo, N. Y.

Application April 29, 1935, Serial No. 18,806

1 Claim. (Cl. 88—38)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a sight for ordnance.

In providing sights for artillery, it has been customary for many years to employ a panoramic telescope of the periscopic type so that the observer could employ an aiming point which was located in any direction. However, in actual practice an aiming point is never selected to the rear of the observer because of interference on the part of the gun crew.

The purpose of this invention is to provide a sight which has sufficient range of action for all practical purposes and which may be constructed for a small part of the cost of a panoramic sight of the periscopic type. This purpose is accomplished by placing a rotatable reflector in front of and along the axis of a telescope.

To these and other ends, the invention consists in the construction, arrangement and combination of elements described hereinafter and pointed out in the claim forming a part of this specification.

A practical embodiment of the invention is illustrated in the accompanying drawing, wherein:

Fig. 1 is a longitudinal sectional view through the sight mount and showing the sighting members in elevation.

Fig. 2 is a plan view.

Fig. 3 is a view in rear elevation.

Fig. 4 is a view in front elevation.

Fig. 5 is a plan view of an alternate form of reflector.

Referring to the drawing by characters of reference there is shown a support 5 on which a telescope 6 is mounted near its forward end by means of a pintle 7. The rear part of the telescope is associated with a traversing mechanism consisting of an arcuate rack 8 fixed on the under side of the telescope and an operating shaft 9 carried by the support.

A reflecting member such as a mirror 10 is positioned in front of the telescope and across the axis thereof and is carried on a base 11 which is rotatably mounted in an opening 12 of the support 5 and has an annular flange 13 resting on the support. The base is provided with a worm wheel 14 which is engaged by a worm 15 on a shaft 16. Reference marks 17 and 18 on the support 5 are readable respectively against mil scales 19 and 20 on the base 11 and on the shaft 16.

In Fig. 5 there is shown a pair of right angle prisms 21 which may be used as a reflector and also to permit straight-ahead vision.

The telescope is moved about its pivot when used without the reflector. The amount of movement is determined or measured by means of customary reference marks 22 and 23 and scales 24 and 25.

I claim.

In a sight for ordnance, a support adapted to be mounted on ordnance, a telescope having a pintle mounted in the support whereby it is rotatable relative to the support and the ordnance, means carried by the support and engageable with the telescope to move the telescope relative to the ordnance in applying a sighting angle, a base rotatably mounted in the support, a reflecting member on the base and positioned along the axis of the telescope, the axis of rotation of the reflecting member and the axis of rotation of the telescope being in the same plane, and means carried by the support and engageable with the base for rotating the base and reflecting member relative to the support.

JAMES C. KARNES.